United States Patent
Cheng et al.

(10) Patent No.: US 6,490,528 B2
(45) Date of Patent: Dec. 3, 2002

(54) METHOD FOR IMAGING DISCONTINUITES IN SEISMIC DATA

(75) Inventors: Yao-Chou Cheng, Bellaire, TX (US); Brian P. West, Houston, TX (US); Alan E. Schwartzbard, Houston, TX (US); John A. Farre, The Woodlands, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 95 days.

(21) Appl. No.: 09/827,574

(22) Filed: Apr. 6, 2001

(65) Prior Publication Data

US 2001/0047245 A1 Nov. 29, 2001

Related U.S. Application Data

(60) Provisional application No. 60/197,587, filed on Apr. 17, 2000.

(51) Int. Cl.[7] ............................................. G01V 1/28
(52) U.S. Cl. ............................ 702/14; 702/16; 702/17
(58) Field of Search ................................. 702/14, 16, 17

(56) References Cited

U.S. PATENT DOCUMENTS

| | | | |
|---|---|---|---|
| 5,563,949 A | 10/1996 | Bahorich et al. | 364/421 |
| 5,724,309 A | 3/1998 | Higgs et al. | 367/48 |
| 5,838,564 A | 11/1998 | Bahorich et al. | 364/421 |
| 5,930,730 A | 7/1999 | Marfurt et al. | 702/16 |
| 6,018,498 A * | 1/2000 | Neff et al. | 367/72 |
| 6,278,949 B1 * | 8/2001 | Alam | 702/16 |

FOREIGN PATENT DOCUMENTS

| | | | |
|---|---|---|---|
| WO | WO 97/39367 | 10/1997 | G01V/1/32 |

* cited by examiner

Primary Examiner—Edward Lefkowitz
Assistant Examiner—Anthony Gutierrez
(74) Attorney, Agent, or Firm—Charles R. Schweppe

(57) ABSTRACT

Structural and stratigraphic discontinuities are identified in a 3-D volume of seismic data samples, by first selecting a plurality of directions containing a primary direction and at least one secondary direction. Next, one-dimensional, two-trace first discontinuity values are calculated along the primary direction for each seismic data sample in the 3-D data volume. Next, a series of sequentially less restrictive thresholds is defined, such that a significant portion, preferably at least approximately 10%, of the first discontinuity values satisfy the first threshold. This significant portion of first discontinuity values is then stored in an output discontinuity volume at the corresponding sample locations. The following steps are repeated for each remaining data sample until that sample has a value stored at the corresponding sample location in the output discontinuity volume. First, one-dimensional, two-trace discontinuity values are calculated for the sample sequentially along the secondary directions and the first of the calculated discontinuity values satisfying the first threshold is stored in the output volume. If none of the calculated discontinuity values satisfies the first threshold, then, the next less restrictive threshold in the series of thresholds is selected. Finally, the discontinuity values calculated along the primary and secondary directions are compared sequentially to the selected threshold and the first of the discontinuity values that satisfies the selected threshold is stored in the output discontinuity volume.

14 Claims, 5 Drawing Sheets

METHOD FOR IMAGING DISCONTINUITES IN SEISMIC DATA

This application claims the benefit of U.S. Provisional Application No. 60/197,587 filed on Apr. 17, 2000.

FIELD OF THE INVENTION

This invention relates generally to the field of geophysical prospecting. More particularly, the invention is a method of identifying structural and stratigraphic discontinuities in a three-dimensional (3-D) seismic data volume.

BACKGROUND OF THE INVENTION

As part of the hydrocarbon exploration and production work process, geoscience interpreters often need to recognize and map subsurface structural features, such as faults, and stratigraphic features, such as channel- or sand-body edges, in three-dimensional seismic data. However, identifying structural and stratigraphic features in 3-D seismic data can be a time consuming, subjective, and difficult process. There is a need to generate, in a computationally efficient matter, a derivative data volume (i.e., a data volume derived from the original seismic data volume), that displays clear sharply focussed structural and stratigraphic features that can be quickly recognized and exploited in the mapping process.

Several techniques have been used in the oil industry to enhance the interpretation of structural and stratigraphic features in 3-D seismic data. A well-known technique is to transform the original amplitude data into a coherence volume using a series of one-dimensional cross-correlation calculations. For every data sample in a volume, the cross-correlation calculation is performed using a user-defined vertical window with the equivalent portion of an adjacent trace. Typically, the vertical window is the target sample in question, plus 3–7 data samples above and below the target sample, depending upon the frequency of the data. This operation is repeated for all data samples and all traces, all in the same correlation direction. The correlation direction is generally in-line, cross-line, or either diagonal direction. The resulting coherence volume typically contains values normalized between −1 and +1. For adjacent traces that are very similar, the value of the coherence sample will be close to +1, since +1 represents high correlation. This similarity, and hence correlation, is expected for adjacent traces that do not straddle a structural or stratigraphic discontinuity. For adjacent traces that do straddle a discontinuity, lack of similarity is expected. Thus, their coherence value would be closer to 0, since 0 represents no correlation. A coherence value of −1 represents negative correlation, such as high correlation with phase reversal. This standard technique has limitations, though, because features perpendicular to the single correlation direction are highlighted, while features parallel to the correlation direction are poorly imaged.

Bahorich and Farmer received U.S. Pat. No. 5,563,949, "Method of Seismic Signal Processing and Exploration", issued Oct. 8, 1996. This patent is commonly known as the "coherence cube" patent. Bahorich and Farmer also obtained a continuation of this patent in U.S. Pat. No. 5,838,564, "Apparatus for Seismic Signal Processing and Exploration", issued Nov. 17, 1998.

Bahorich and Farmer's '949 patent describes a method for converting a fully processed 3-D seismic data volume into a cube of coherence measurements. According to their method, the 3-D data volume is divided into a plurality of horizontal slices, and each horizontal slice is further divided into a plurality of cells, each of which contains portions of at least three seismic data traces. As described in the '949 patent, these at least three traces in each cell comprise a reference trace, an in-line trace, and a cross-line trace. The in-line trace and the cross-line trace are each compared to the reference trace in each cell using a measure of coherency. Then the in-line and cross-line coherency measures are combined to obtain a single value that is representative of the coherence of the three seismic traces for each cell. This process is repeated for every cell, using every trace in the 3-D seismic volume as a reference trace, in order to obtain a 3-D cube of coherence measurements. Bahorich and Farmer's '564 patent describes the corresponding apparatus for carrying out the process of their '949 patent.

Bahorich and Farmer's patented technique combines information from more than one correlation direction at each data sample in the 3-D seismic data volume, thereby highlighting structural and stratigraphic information along multiple azimuths. According to Bahorich and Farmer, in their invention "the concept of cross-correlation is extended to two dimensions by taking the geometric means between the classical one dimensional cross-correlations" (U.S. Pat. No. 5,563,949, column 4, lines 17–20). This technique has limitations, however. Combining information from different correlation directions may effect the image clarity of the structural and stratigraphic features. This decrease in clarity can make it more difficult to extract structural and stratigraphic information in automated mapping processes. In addition, the computational complexity of this procedure is significantly greater than the traditional method using classical one-dimensional cross-correlations.

Higgs and Luo received U.S. Pat. No. 5,724,309 "Method for Geophysical Processing and Interpretation Using Instantaneous Phase and Its Derivatives and Their Derivatives", issued Mar. 3, 1998. Higgs and Luo's '309 patent describes a related technique for interpretation of faults and stratigraphic features. The technique uses instantaneous phase and its spatial derivatives to determine values of spatial frequency, instantaneous frequency, dip magnitude and dip azimuth. These values are plotted to produce a derivative seismic volume that highlights subsurface changes. The main advantage is its computational speed. However, the instantaneous phase and frequency images tend to be of lower resolution than traditional cross-correlation images. A similar technique was also published by Hardage et al., 1998, "3-D Instantaneous Frequency used as a Coherency/Continuity Parameter to Interpret Reservoir Compartment Boundaries Across an Area of Complex Turbidite Deposition", Geophysics, Vol. 63, No. 5, pp. 1520–1531. This technique uses instantaneous frequency images to define reservoir compartments by identifying facies boundaries.

Gersztenkom's International Patent Application No. PCT/US97100249, "Method and Apparatus for Seismic Signal Processing", was published as International Publication No. WO 97/39367 on Oct. 23, 1997. This technique generates a covariance matrix for an ensemble of seismic traces and then estimates the degree of similarity between traces by estimating the largest eigenvalue of the covariance matrix. It identifies the maximum coherence component and therefore identifies structural and stratigraphic discontinuities in the data at all azimuths. The main disadvantage is that because this technique estimates eigenvalues of the covariance matrix for each time sample in the volume, it is computationally intensive.

Marfurt, Kirlin, Farmer, and Bahorich received U.S. Pat. No. 5,930,730 "Method and Apparatus for Seismic Signal Processing and Exploration", issued Jul. 27, 1999. The '730 patent describes a method for identifying structural and stratigraphic features in three dimensions. After datumming is applied to remove a significant portion of the regional structural dip, a semblance calculation is applied as a function of time to multiple seismic traces in multiple directions to further estimate and correct for local dip. A maximum semblance cube is created that highlights structural and stratigraphic discontinuities, corrected for structural dips. Improved imaging is obtained in areas of higher structural dip and seismic noise. The main disadvantage of this method is that it is very computationally intensive.

Marfurt, Gersztenkorn, Nissen, Sudhaker, and Crawford published a paper in Geophysics, Vol. 64, No. 1, pp. 1040111, January–February 1999, "Coherency Calculations in the Presence of Structural Dip". The technique described in this publication examines the similarity of multiple traces at various time lags to estimate the dip of reflectors. An eigenvalue algorithm is then used to calculate the similarity of traces in the locally averaged dip direction. The main advantage of this approach is the minimization of coherency artifacts due to the dip of reflectors and thus a sharpening of the image. The main disadvantage is that this approach can be computationally intensive.

It can be seen from the foregoing that a need exists for a computationally efficient method for identifying structural and stratigraphic features in 3-D seismic data that effectively images features of different orientation directions while maintaining image clarity.

SUMMARY OF THE INVENTION

The present invention is a method for detecting structural and stratigraphic discontinuities in a 3-D volume of seismic data samples. One embodiment comprises the following steps. First, a plurality of directions in the 3-D volume are selected in a sequential order. Next, a series of sequentially less restrictive thresholds is defined. Then, the following steps are performed for each data sample in the 3-D volume until the sample has a value stored at the corresponding sample location in the output discontinuity volume. First, one-dimensional, two-trace discontinuity values are calculated for the data sample sequentially along the directions and the first of the calculated discontinuity values that satisfies the first threshold is stored in the output discontinuity volume. Then, the following steps are repeated for the data sample until the sample has a value stored at the corresponding sample location in the output discontinuity volume. First, the next less restrictive threshold in the series of thresholds is selected. Then, the discontinuity values calculated along the directions are compared sequentially to the selected threshold and the first of the discontinuity values that satisfies the selected threshold is stored in the output discontinuity volume.

A further embodiment of the present invention comprises the following steps. First, a plurality of directions is selected containing a primary direction and at least one secondary direction. Next, one-dimensional, two-trace first discontinuity values are calculated along the primary direction for each seismic data sample in the 3-D data volume. Next, a series of sequentially less restrictive thresholds is defined, such that a significant portion, preferably at least approximately 10%, of the first discontinuity values satisfy the first threshold. This significant portion of first discontinuity values is then stored in an output discontinuity volume at the corresponding sample locations. The following steps are then repeated for each remaining data sample until that sample has a value stored at the corresponding sample location in the output discontinuity volume. First, one-dimensional, two-trace discontinuity values are calculated for the sample sequentially along the secondary directions and the first of the calculated discontinuity values that satisfies the first threshold is stored in the output volume. If none of the calculated discontinuity values satisfies the first threshold, then the next less restrictive threshold in the series of thresholds is selected. Finally, the discontinuity values calculated along the primary and secondary directions are compared sequentially to the selected threshold and the first of the discontinuity values that satisfies the selected threshold is stored in the output discontinuity volume. This process is repeated until a discontinuity value has been stored in each sample location in the output discontinuity volume.

A further embodiment of the present invention comprises the following steps. First, second, third and fourth directions are selected in a 3-D volume of seismic data samples. First, one-dimensional, two-trace discontinuity values are calculated along the first direction for each sample. A primary threshold and a series of sequentially less restrictive secondary thresholds are defined such that a significant portion, preferably at least approximately 10%, of the first discontinuity values satisfy the primary threshold. Then, this significant portion of the first discontinuity values is stored in an output discontinuity volume at the corresponding sample locations. The following steps are then performed for each remaining data sample, until the sample has a value stored at the corresponding sample location. A second discontinuity value is calculated along the second direction for the sample and is stored in the output volume if it satisfies the primary threshold. If the second discontinuity value does not satisfy the first threshold, then a third discontinuity value is calculated along the third direction for the sample and is stored in the output discontinuity volume if it satisfies the primary threshold. If the third discontinuity value does not satisfy the first threshold, then a fourth discontinuity value is calculated along the fourth direction for the sample and is stored in the output discontinuity volume if it satisfies the primary threshold. Finally, the following steps are repeated until the sample has a stored value. The next less restrictive threshold in the series of secondary thresholds is selected. The first discontinuity value is stored in the output discontinuity volume if it satisfies the next threshold. If the first discontinuity value does not satisfy the next threshold, then the second discontinuity value is stored in the output discontinuity volume if it satisfies the next threshold. If the second discontinuity value does not satisfy the next threshold, then the third discontinuity value is stored in the output discontinuity volume if it satisfies the next threshold. If the third discontinuity value does not satisfy the next threshold, then the fourth discontinuity value is stored in the output discontinuity volume if it satisfies the next threshold.

BRIEF DESCRIPTION OF THE DRAWINGS

The present invention and its advantages may be more easily understood by reference to the following detailed description and the attached drawings in which.

While the present invention will be described in connection with its preferred embodiments, it will be understood that the present invention is not limited thereto. On the contrary, it is intended to cover all alternatives, modifications and equivalents that may be included within the spirit and scope of the present invention, as defined by the appended claims.

DETAILED DESCRIPTION OF THE INVENTION

Figure 1:
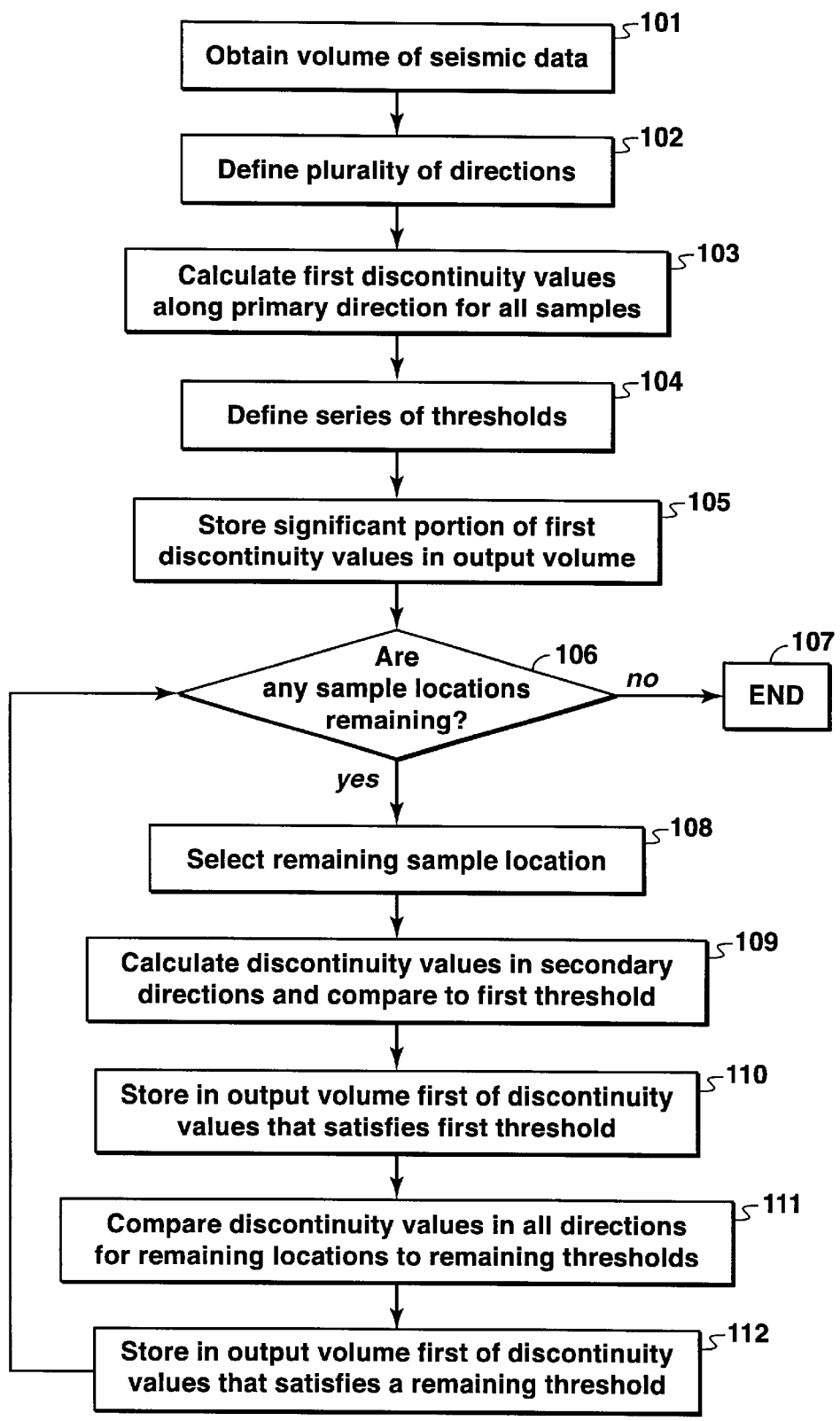
FIG. 1 is a flowchart illustrating the processing steps for an embodiment of the method of the present invention for detecting structural and stratigraphic discontinuities in seismic data.

The present invention is a method for detecting structural and stratigraphic discontinuities in a 3-D volume of seismic data samples. FIG. 1 is a flowchart illustrating the processing steps for a first embodiment of the method of the present invention. This embodiment will be described in general terms. First, in step 101, a 3-D volume of seismic data samples is obtained, preferably from fully processed seismic amplitude data. Next, in step 102, a plurality of directions containing a primary direction and at least one secondary direction is defined in sequential order for the volume of seismic data samples. These directions are preferably approximately horizontal or parallel to the trend of the main formation in the seismic data. Next, in step 103, first discontinuity values are calculated along the primary direction selected in step 102 for each seismic data sample in the volume obtained in step 101. Next, in step 104, a series of discontinuity thresholds containing a primary threshold and at least one secondary threshold is defined, such that a significant portion of the first discontinuity values that were calculated in step 103 satisfies the primary threshold. Preferably, the significant portion comprises at least approximately 10% of the first discontinuity values; however, a lesser percentage would still be within the scope of the present invention. Next, in step 105, this significant portion of the first discontinuity values satisfying the primary threshold is stored in an output discontinuity volume at the corresponding sample locations, and no further discontinuity values are calculated for these sample locations.

In step 106, it is determined if there are any remaining sample locations, that is, those that do not yet have a discontinuity value stored in the corresponding location in the output discontinuity volume. If there are no remaining sample locations, then the process ends at step 107. If there are remaining sample locations to fill, then the process continues to step 108. Here one of the remaining sample locations is selected for processing until a discontinuity value for it is found to satisfy a threshold and can be stored in the output discontinuity volume. In step 109, discontinuity values are sequentially calculated for the selected sample location from step 108 along the secondary directions, in the order in which the directions were defined in step 102. In step 110, the first of the discontinuity values calculated in step 109 which is found to satisfy the primary threshold is stored in the output discontinuity volume in the corresponding sample location. In step 111, the calculated discontinuity values along both primary and secondary directions, from steps 103 and 109, respectively, are sequentially compared to the secondary thresholds. In step 112, the first of the discontinuity values that is found to satisfy the next secondary threshold is stored in the output discontinuity volume at the corresponding sample location. Finally, the process returns to step 106 to check remaining sample locations, if any.

Figure 2:
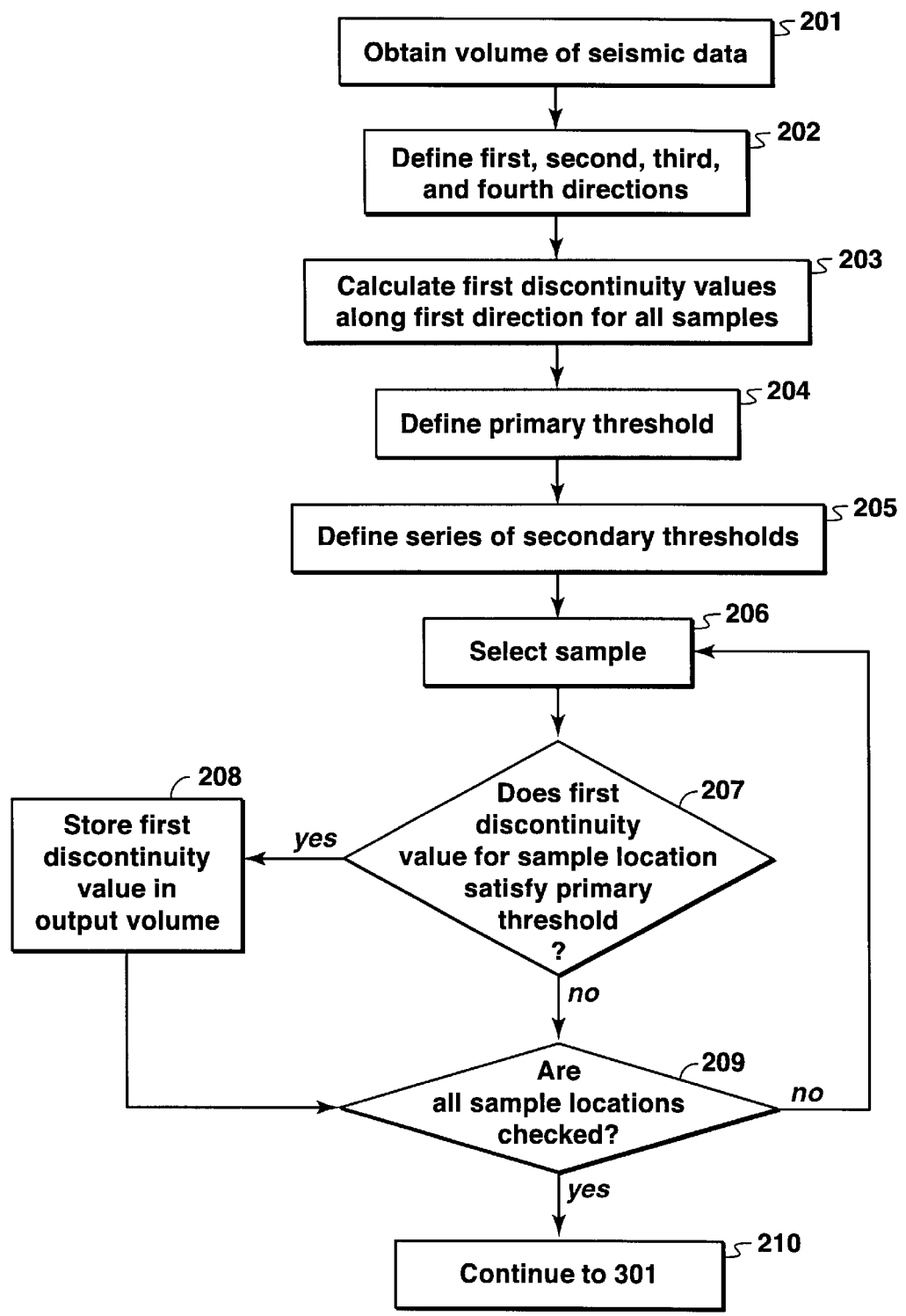
FIG. 2 is a flowchart illustrating the initial processing steps of the preferred embodiment of the method of the present invention.
Figure 3:
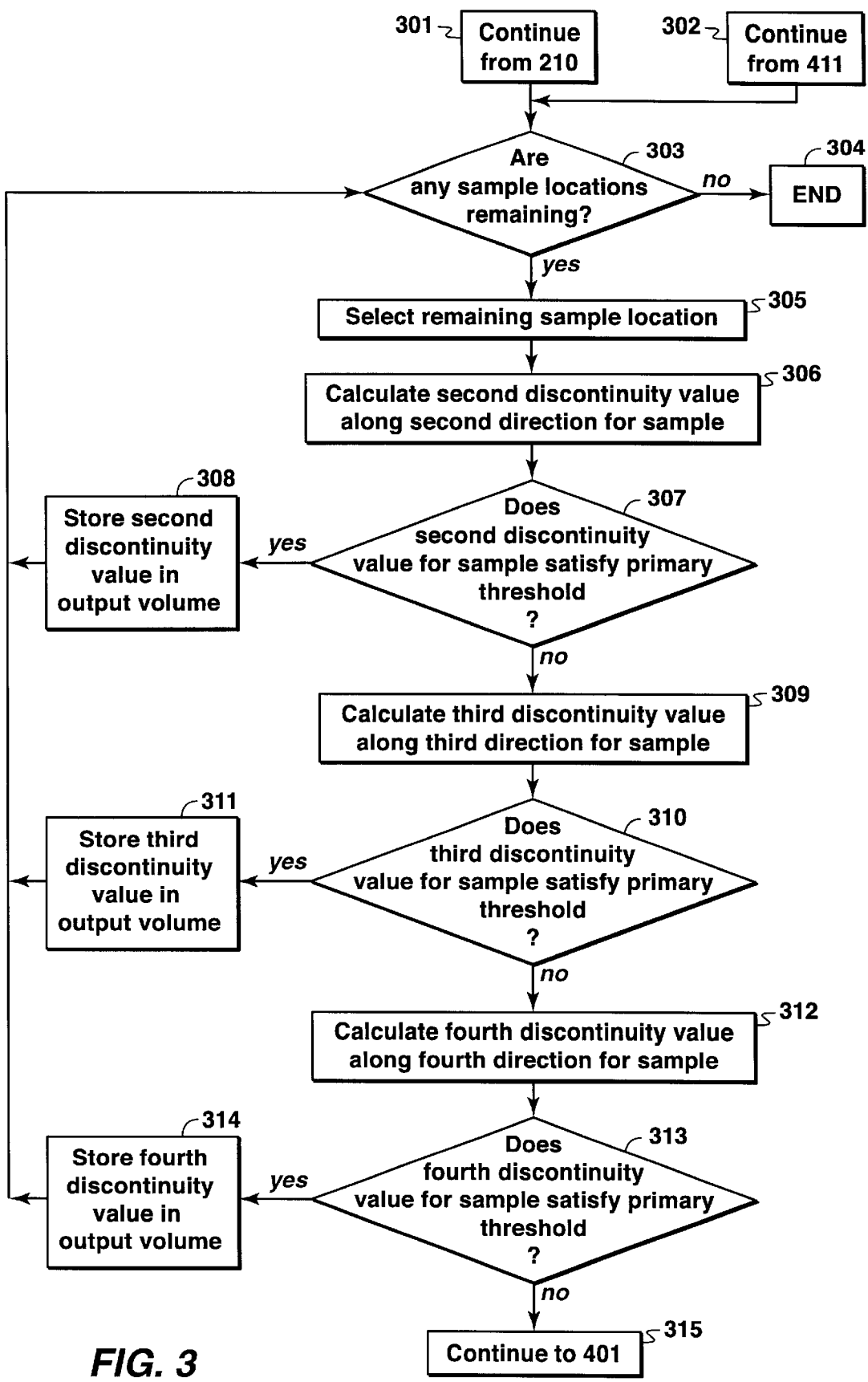
FIG. 3 is a flowchart illustrating the intermediate processing steps of the preferred embodiment of the method of the present invention.
Figure 4:
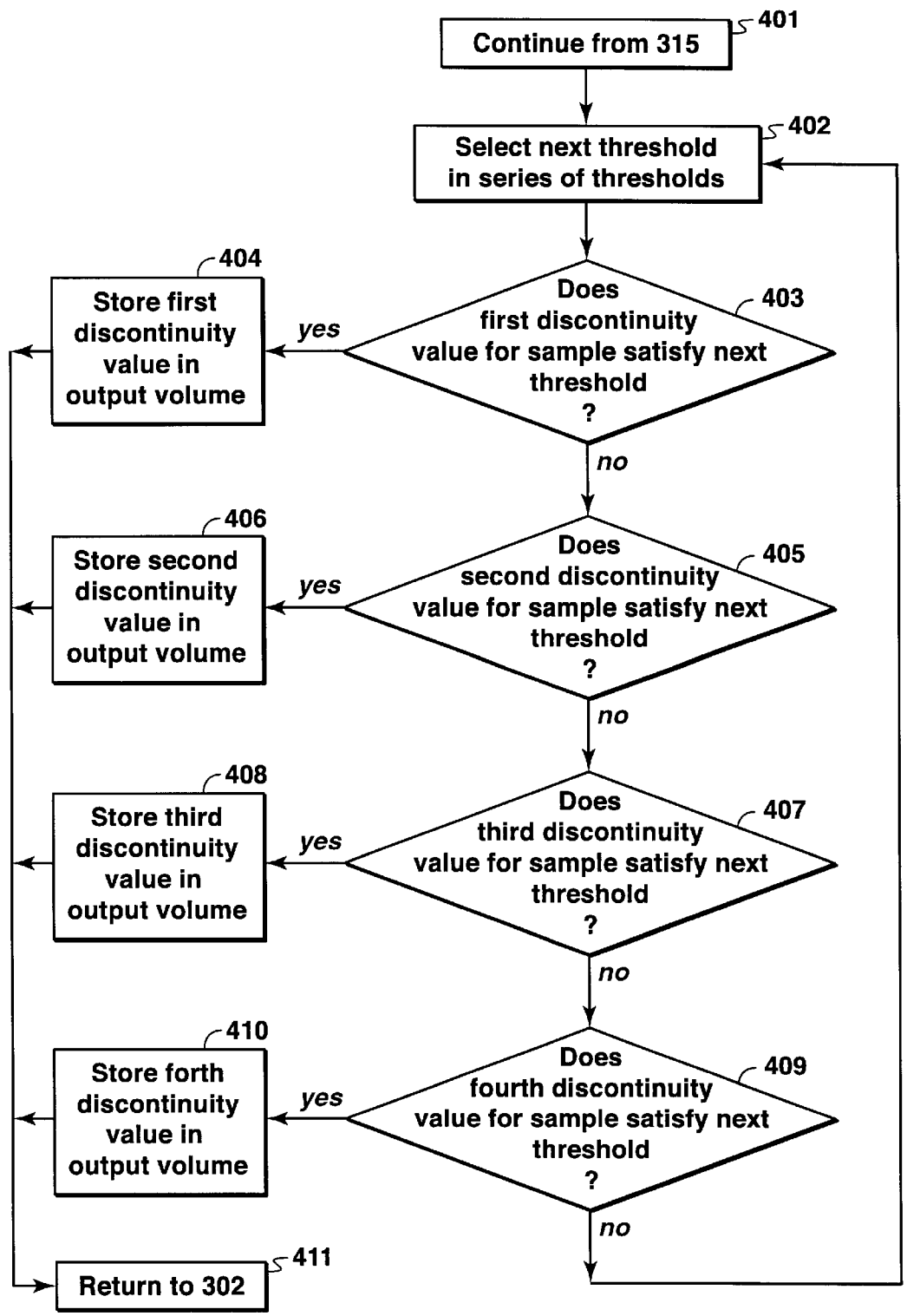
FIG. 4 is a flowchart illustrating the final processing steps of the preferred embodiment of the method of the present invention.

FIGS. 2–4 illustrate the processing steps of a preferred embodiment of the method of the present invention for detecting structural and stratigraphic discontinuities in seismic data. FIG. 2 is a flowchart illustrating the initial processing steps of a preferred embodiment. First, in step 201, a volume of seismic data samples is obtained. Any type of seismic data may be used, but, preferably, the data will be seismic amplitude data in the form of fully processed seismic traces. Other appropriate seismic data includes, but is not limited to, impedance data, curvature data, and prestack seismic data. Noise in the seismic data can effect the results of the method of the present invention. To minimize the effects of noise, a 3×3 median filter is preferably applied to the volume of seismic data. Areas of steep dip can also effect the imaging results of the method of the present invention. A dip steering technique will improve this imaging. In some cases, existing technology well known to those in the art can minimize the negative effects of dip steering by flaftening or datumming the volume along a stratigraphic layer.

Next, in step 202, four directions are defined. These directions are labeled as the first, second, third, and fourth directions, respectively. Usually these four directions comprise the in-line, cross-line and two diagonal directions. Since the seismic traces are usually in the vertical direction, the four directions are typically chosen to be horizontal or parallel to the trend of the main formations in the seismic data. A primary direction for initial discontinuity identification is selected from among these four directions and is designated as the first direction. Preferably, the first direction is selected to be perpendicular to the main features of interest in the seismic data. This direction is the dominant structural or stratigraphic grain of interest in the seismic data. This is the direction best imaged by the similarity measures used in the method of the present invention. The remaining three directions are the secondary directions and are designated as in a sequential order.

Next, in step 203, first discontinuity values are calculated along the first direction selected in step 202 for all the samples in the seismic data volume obtained in step 201. The discontinuity calculation used is preferably a traditional one-dimensional correlation method that measures similarity between two adjacent seismic traces, such as cross-correlation or semblance. The preferred method is single-direction, two-trace cross-correlation. The discontinuity calculation is made in a vertical sample window. Typically, the sample window will extend 3 to 7 samples above and below the target sample.

The quality of the results from the method of the present invention is dependent upon the quality of the input data. A decrease in quality of output data is generally seen with increasing depth in the subsurface. One cause of this depth effect is that often sample data frequency decreases with increasing depth. Thus, the use of a single sample window for performing the trace similarity calculations for the entire volume may be inappropriate. The results may be improved by varying the sample window size with varying depth in the data volume.

Next, in step 204, a primary threshold is defined. This primary threshold selects for the least coherent seismic amplitude data. The primary threshold is chosen so that a significant portion of the first discontinuity values that were calculated in step 203 satisfy the primary threshold. Preferably, the significant portion comprises at least approximately 10% of the first discontinuity values. Next, in step 205, a series of secondary thresholds are defined. These secondary thresholds are chosen so that each is sequentially less restrictive than the previous threshold in the series. Preferably, the primary and secondary thresholds are in the form of upper bounds and thus discontinuity values satisfy a threshold by being less than the threshold. However, the thresholds are not restricted to this form. The series of thresholds is chosen to span the expected range of discontinuity values that might be calculated for all the samples in all four directions from step 202.

Next, in step 206, a sample is selected from the initial volume of seismic amplitude data from step 201. In step 207, the first discontinuity value from step 203 for the selected sample is compared to the primary threshold from step 204. If the first discontinuity value satisfies the primary threshold, the first discontinuity value for this sample is stored in the corresponding sample location in the output discontinuity volume in step 208. If not, than the process proceeds to step 209. Here, if not all the first discontinuity values for the samples have been compared to the primary threshold, the process returns to step 206 to select another sample. If all the first discontinuity values for the samples have been compared to the primary threshold, then the process continues to step 210. Here, the process continues on to step 301 of FIG. 3.

Because of the manner in which the primary threshold is defined in step 204, a significant portion of the first discontinuity values calculated in step 203 are stored in the output discontinuity volume by the repetition of step 208. Once a sample location in the output discontinuity volume is filled by a stored value, no further checking or calculations occur at the corresponding sample location in the input volume of seismic data from step 201. Thus, for a significant portion of sample locations in the input volume of seismic data, only one-dimensional, two-trace discontinuity calculations are made. Further, for this significant portion of sample locations, no calculations or operations are made in any other than the primary direction.

FIG. 3 is a flowchart illustrating the intermediate processing steps of a preferred embodiment of the method of the present invention. First, in step 301, the process continues from step 210 of FIG. 2. Next, in step 303, the process determines whether any sample locations from the initial volume of seismic amplitude data remain which have not had discontinuity values stored in the corresponding sample locations in the output discontinuity volume. If no such sample locations remain, then the process ends at step 304. If such sample locations remain, then the process continues to step 305.

At step 305, one of the remaining sample locations is selected. In step 306, a second discontinuity value is calculated for the selected sample along the second direction from step 202 of FIG. 2. In step 307, the second discontinuity value from step 306 is compared to the primary threshold from step 204 of FIG. 2. If the second discontinuity value satisfies the primary threshold, then the second discontinuity value is stored for that sample in the output discontinuity volume in step 308. Then the process returns to step 303 to select another sample, if any remain. If the second discontinuity value does not satisfy the primary threshold, then the process continues to step 309.

At step 309, a third discontinuity value is calculated for the selected sample along the third direction from step 202 of FIG. 2. In step 310, the third discontinuity value from step 309 is compared to the first threshold from step 203 of FIG. 2. If the third discontinuity value satisfies the primary threshold, then the third discontinuity value is stored for that sample in the output discontinuity volume in step 311. Then the process returns to step 302 to select another sample, if any remain. If the third discontinuity value does not satisfy the primary threshold, then the process continues to step 312.

At step 312, a fourth discontinuity value is calculated for the selected sample along the fourth direction from step 202 of FIG. 2. In step 313, the fourth discontinuity value from step 312 is compared to the primary threshold from step 203 of FIG. 2. If the fourth discontinuity value satisfies the primary threshold, then the fourth discontinuity value is stored for that sample in the output discontinuity volume in step 314. Then the process returns to step 302 to select another sample, if any remain. If the fourth discontinuity value does not satisfy the primary threshold, then the process continues to step 315. Here the process continues on to step 401 of FIG. 4.

Thus, discontinuity values are sequentially calculated in the four directions and compared to the primary threshold. The first of the discontinuity values found to satisfy the primary threshold is placed in the corresponding sample location in the output discontinuity volume. Once a location in the output discontinuity volume is filled, no further operations occur at the corresponding sample location in the input volume of seismic data.

FIG. 4 is a flowchart illustrating the final processing steps of a preferred embodiment of the method of the present invention. First, in step 401, the process continues from step 315 of FIG. 3. Next, in step 402, the next threshold in the series of thresholds from steps 204 and 205 of FIG. 2 is selected. By construction, the next threshold will be less restrictive than the previous threshold. Next, in step 403, the first discontinuity value for the selected sample is compared to the next threshold from step 402. If the first discontinuity value satisfies the next threshold, then the first discontinuity value is stored for that sample in the corresponding sample location in the output discontinuity volume in step 404. Then the process continues to step 411, where the process returns to step 302 of FIG. 3 to select another sample, if any remain. If the first discontinuity value does not satisfy the next threshold, then the process continues on to step 405.

At step 405, the second discontinuity value for the selected sample is compared to the next threshold from step 402. If the second discontinuity value satisfies the next threshold, then the second discontinuity value is stored for that sample in the corresponding sample location in the output discontinuity volume in step 406. Then the process continues to step 411, where the process returns to step 302 of FIG. 3 to select another sample, if any remain. If the second discontinuity value does not satisfy the next threshold, then the process continues on to step 407.

At step 407, the third discontinuity value for the selected sample is compared to the next threshold from step 402. If the third discontinuity value satisfies the next threshold, then the third discontinuity value is stored for that sample in the corresponding sample location in the output discontinuity volume in step 408. Then the process continues to step 411, where the process returns to step 302 of FIG. 3 to select another sample, if any remain. If the third discontinuity value does not satisfy the next threshold, then the process continues on to step 409.

At step 409, the fourth discontinuity value for the selected sample is compared to the next threshold from step 402. If the fourth discontinuity value satisfies the next threshold, then the fourth discontinuity value is stored for that sample in the corresponding sample location in the output discontinuity volume in step 410. Then the process continues to step 411, where the process returns to step 302 of FIG. 3 to select another sample, if any remain. If the fourth discontinuity value does not satisfy the next threshold, then the process returns to step 402 to select the next threshold in the series of thresholds. Steps 402 to 411 are repeated until all samples from the initial volume of seismic amplitude data have discontinuity values stored in the corresponding locations of the output discontinuity volume. The resulting output volume may be imaged in any manner known in the art.

Thus, the remaining calculated discontinuity values in the four directions are sequentially compared to the series of thresholds. The first of the discontinuity values found to satisfy the next threshold in series is placed in the output discontinuity volume. Once a location in the output discontinuity volume is filled, no further operations occur at the corresponding sample location in the input volume of seismic data.

As a further embodiment, the method of the present invention has been parallelized to take advantage of multi-CPU computers. This is possible because of the nature of the algorithm used to construct the output discontinuity volume. Including the median filter step, this parallelization increases the speed of calculation by an order of magnitude. For example, a 20-gigabyte output discontinuity volume can be generated on a 12 CPU workstation in approximately 40 hours instead of approximately 400 hours.

The method of the present invention allows the use of different correlation directions at different sample locations rather than combining the information from different directions at each sample location. The present invention uses fast one-dimensional, two-trace discontinuity calculations rather than multi-direction coherence or semblance calculations. Thus, the present invention provides a computationally efficient technique for identifying structural and stratigraphic features in 3-D seismic data that effectively images features of different orientation directions while maintaining image clarity.

Example

Figure 5:
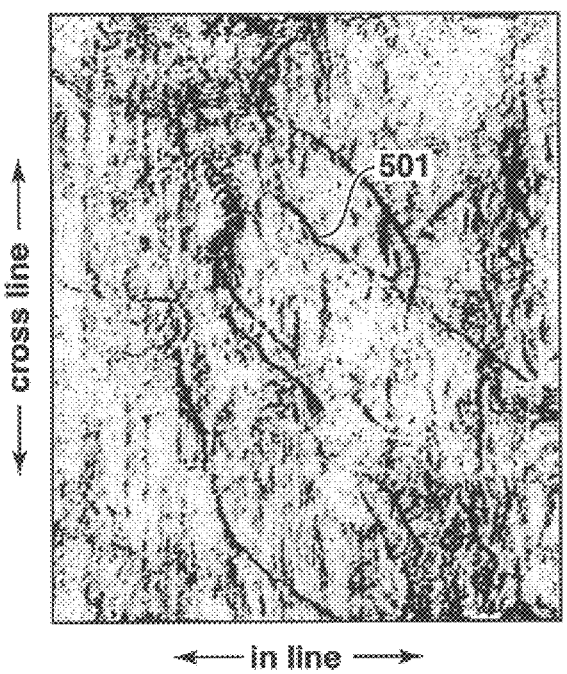
FIG. 5 is a time slice image illustrating discontinuity data calculated using two-trace, single-direction cross-correlation.
Figure 6:
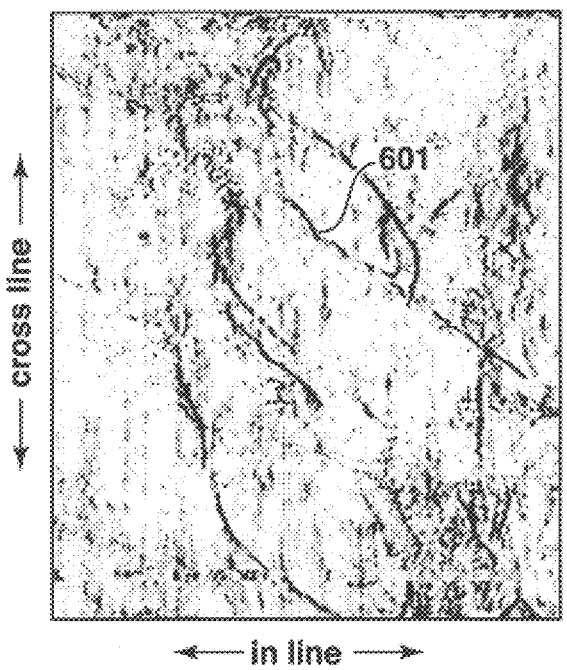
FIG. 6 is a time slice image illustrating discontinuity data calculated using the method of the present invention.

FIGS. 5 and 6 illustrate the difference in calculating coherence or discontinuity data for a single time slice dataset. FIG. 5 illustrates the results of using traditional two-trace, single-direction cross-correlation as the coherency measure. The search direction for the cross-correlation is from upper left to lower right. Discontinuities perpendicular to this search direction are well imaged, but discontinuities parallel to the search direction are poorly imaged. For example, see the discontinuities in area 501. FIG. 6 illustrates the results of using the method of the present invention. The discontinuities are imaged in multiple orientations and are thus sharper and clearer than in FIG. 5. For example, see area 601. Observation of the results of using the method of Bahorich and Farmer's '949 patent, licensed from Coherence Technology Company, show that discontinuities are better imaged in multiple orientations than those created using traditional two-trace, single-direction cross-correlations. However, the discontinuities are not as clearly imaged as those created using the method of the present invention.

It should be understood that the present invention is not to be unduly limited to the foregoing which has been set forth for illustrative purposes. Various modifications and alternatives will be apparent to those skilled in the art without departing from the true scope of the present invention, as defined in the following claims.

We claim:

1. A method for detecting structural and stratigraphic discontinuities in a volume of seismic data samples, comprising the steps of:
    (a) selecting a plurality of directions in the volume in a sequential order;
    (b) defining a series of sequentially less restrictive thresholds; and
    (c) performing the following steps for each data sample until the sample has a value stored at a corresponding sample location in an output discontinuity volume:
        (1) calculating one-dimensional, two-race discontinuity values for the data sample sequentially along the directions and storing in the output discontinuity volume the first of the calculated discontinuity values that satisfies the first threshold; and
        (2) repeating the following steps for the data sample until the sample has a value stored at the corresponding sample location in the output discontinuity volume:
            (i) selecting the next less restrictive threshold in the series of thresholds; and
            (ii) comparing the discontinuity values calculated along the directions sequentially to the selected threshold and storing in the output discontinuity volume the first of the discontinuity values that satisfies the selected threshold.

2. A method for detecting structural and stratigraphic discontinuities in a volume of seismic data samples, comprising the steps of:
    (a) selecting a plurality of directions containing a primary direction and at least one secondary direction;
    (b) calculating one-dimensional, two-race first discontinuity values along the primary direction for each seismic data sample;
    (c) defining a series of sequentially less restrictive thresholds, such that a significant portion of the first discontinuity values satisfies the first threshold and storing this significant portion of first discontinuity values in an output discontinuity volume at a corresponding sample location, and
    (d) repeating the following steps for each remaining sample until the sample has a value stored at a corresponding sample location in the output discontinuity volume:
        (1) calculating one-dimensional, two-trace discontinuity values for the sample sequentially along each of the at least one secondary direction and storing in the output discontinuity volume the first of the calculated discontinuity values that satisfies the first threshold;
        (2) selecting the next less restrictive threshold in the series of thresholds; and
        (3) comparing the discontinuity values calculated along the primary and secondary directions sequentially to the selected threshold and storing in the output volume the first of the discontinuity values that satisfies the selected threshold.

3. The method of claim 2, wherein the significant portion of the first discontinuity values is at least approximately 10%.

4. The method of claim 2, wherein the seismic data samples are seismic amplitudes.

5. The method of claim 2, wherein the calculated discontinuity values are cross-correlations.

6. The method of claim 2, wherein the calculated discontinuity values are semblances.

7. The method of claim 2, wherein the primary direction is selected to be substantially perpendicular to the structural features of interest in the volume of seismic data samples.

8. The method of claim 2, wherein the primary direction is selected to be substantially perpendicular to the stratigraphic features of interest in the volume of seismic data samples.

9. The method of claim 2, wherein the discontinuity values are calculated in a vertical sample window.

10. The method of claim 9, wherein the size of the vertical sample window varies with depth of the seismic data sample.

11. The method of claim 2, further comprising the step of:
   applying a 3×3 median filter to the volume of seismic data samples before calculating the first discontinuity values.

12. The method of claim 2, wherein the method is performed on parallel computers.

13. A method for detecting structural and stratigraphic discontinuities in a volume of seismic data samples, comprising the steps of:
   (a) defining first, second, third, and fourth directions in the volume of seismic data samples;
   (b) calculating one-dimensional, two-trace first discontinuity values along the first direction for each seismic data sample;
   (c) defining a primary threshold and a series of sequentially less restrictive secondary thresholds, such that a significant portion of the first discontinuity values satisfies the primary threshold;
   (d) storing the significant portion of the first discontinuity values that satisfies the primary threshold in an output volume at a corresponding sample location; and
   (e) performing the following steps for each remaining sample until the sample has a value stored at the corresponding sample location in the output volume:
      (1) calculating a second discontinuity value along the second direction for the sample and storing the second discontinuity value in the output volume if the second discontinuity value satisfies the primary threshold;
      (2) calculating a third discontinuity value along the third direction for the sample and storing the third discontinuity value in the output volume if the third discontinuity value satisfies the primary threshold;
      (3) calculating a fourth discontinuity value along the fourth direction for the sample and storing the fourth discontinuity value in the output volume if the fourth discontinuity value satisfies the primary threshold; and
      (4) repeating the following steps until the sample has a stored value:
         (i) selecting the next less restrictive threshold in the series of secondary thresholds;
         (ii) storing the first discontinuity value in the output volume if the first discontinuity value satisfies the next threshold;
         (iii) storing the second discontinuity value in the output volume if the second discontinuity value satisfies the next threshold;
         (iv) storing the third discontinuity value in the output volume if the third discontinuity value satisfies the next threshold; and
         (v) storing the fourth discontinuity value in the output volume if the fourth discontinuity value satisfies the next threshold.

14. The method of claim 13, wherein the first, second, third, and fourth directions comprise the in-line, cross-line, and two diagonal directions.

* * * * *